United States Patent [19]

Aoyagi et al.

[11] Patent Number: 4,561,250
[45] Date of Patent: Dec. 31, 1985

[54] HYDRAULIC DRIVE SYSTEM HAVING A PLURALITY OF PRIME MOVERS

[75] Inventors: Yukio Aoyagi; Eiki Izumi, both of Ibaraki; Takeshi Yamaguchi, Tsuchiura; Sotaro Tanaka, Ibaraki, all of Japan

[73] Assignee: Hitachi Construction Machinery Co., Ltd., Tokyo, Japan

[21] Appl. No.: 346,249

[22] Filed: Feb. 5, 1982

[30] Foreign Application Priority Data

Feb. 10, 1981 [JP] Japan .................. 56-17468
Feb. 10, 1981 [JP] Japan .................. 56-17469

[51] Int. Cl.$^4$ ............................. F15B 11/16
[52] U.S. Cl. .................... 60/430; 60/447;
  60/449; 60/444; 60/468; 60/486; 60/483
[58] Field of Search .......... 60/447, 449, 486, 428,
  60/444, 452, 468, 430, 483; 180/69.6; 91/6, 29

[56] References Cited

U.S. PATENT DOCUMENTS

| | | | |
|---|---|---|---|
| 3,948,049 | 4/1976 | Ohms et al. | 60/428 |
| 4,345,436 | 8/1982 | Johnson | 60/428 |
| 4,384,455 | 5/1983 | Kline | 60/468 |
| 4,395,878 | 8/1983 | Morita et al. | 60/444 |

FOREIGN PATENT DOCUMENTS 1550648 11/1965 Fed. Rep. of Germany .
1265690  4/1968 Fed. Rep. of Germany .

Primary Examiner—Abraham Hershkovitz
Assistant Examiner—John M. Husar
Attorney, Agent, or Firm—Antonelli, Terry & Wands

[57] ABSTRACT

A hydraulic drive system including at least one hydraulic actuator, two variable displacement hydraulic pumps each connected to the hydraulic actuator to form a closed circuit therewith and connected in parallel with each other, two prime movers each driving one of the hydraulic pumps, and directional control valves each arranged between the hydraulic actuators and one of the hydraulic pumps. The directional control valves are each operative to shut, when one of the prime movers associated therewith is shut down, the hydraulic pump connected to the shutdown prime mover off the other hydraulic pump and the hydraulic actuator, to thereby prevent the hydraulic pump from being rotated by the pressure fluid delivered by the other hydraulic pump.

10 Claims, 8 Drawing Figures

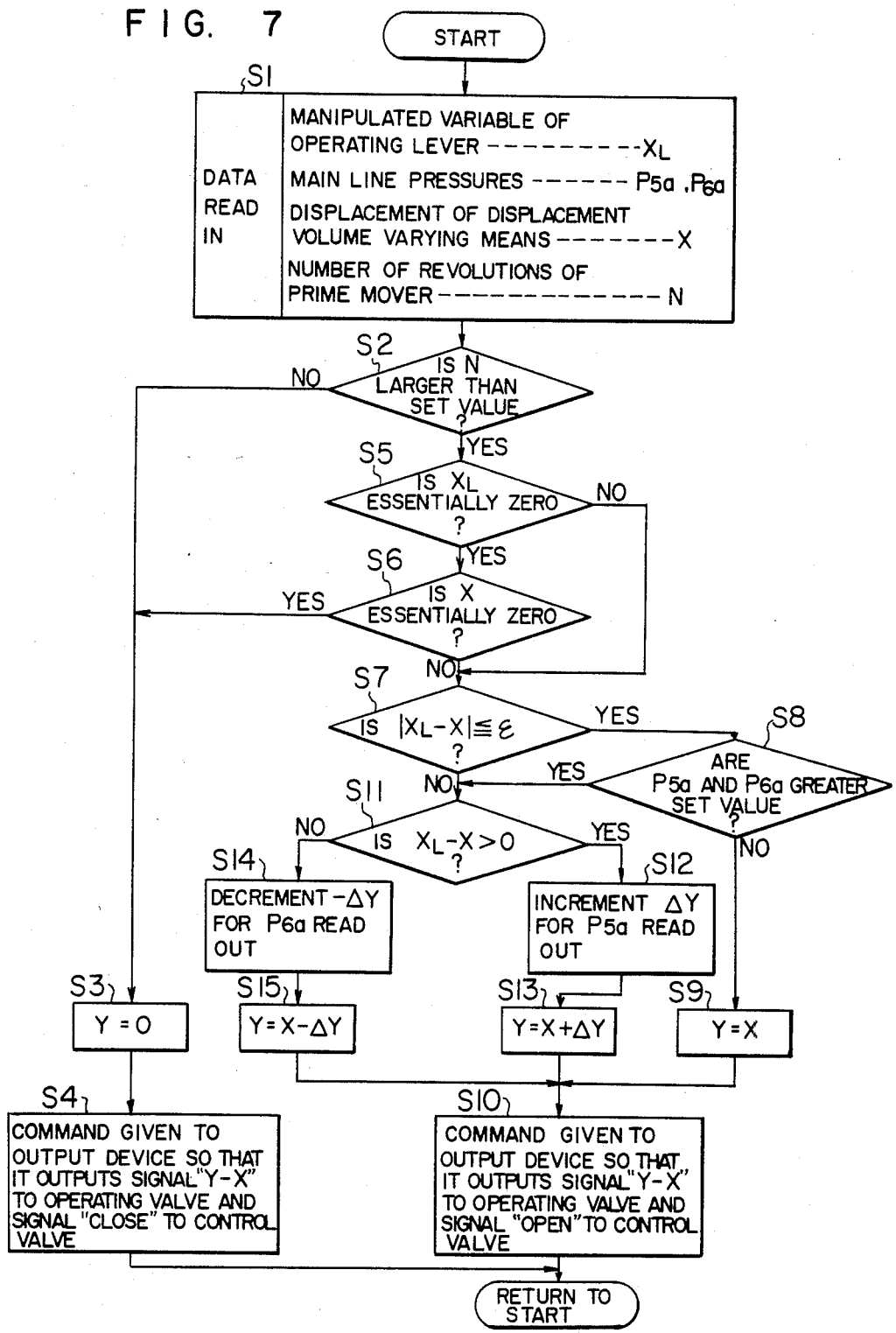

4,561,250

HYDRAULIC DRIVE SYSTEM HAVING A PLURALITY OF PRIME MOVERS

BACKGROUND OF THE INVENTION

This invention relates to a hydraulic drive system for driving, for example, a large size hydraulic shovel, with the hydraulic drive system comprising at least one hydraulic actuator, a plurality of hydraulic pumps connected in parallel with one another and each connected to the hydraulic actuator to form a closed circuit therewith, and a plurality of prime movers each for driving the plurality of hydraulic pumps.

In the field of civil engineering machinery, such as, for example hydraulic shovels, a hydraulic drive system is known which comprises a single variable displacement hydraulic pump connected to one or a plurality of hydraulic actuators to form a closed circuit therewith. In this hydraulic drive system, operation of the actuators is controlled by controlling the direction in which the pump delivers pressure fluid and the flow rate of the delivered pressure fluid without using a directional control valve mounted between the hydraulic pump and the actuators. In recent years, to cope with an increase in the size of hydraulic shovels and an increase in the size of the hydraulic actuators, a hydraulic drive system has been proposed which comprises two variable displacement hydraulic pumps connected in parallel with each other and each connected to hydraulic actuators to form a closed circuit therewith. The two hydraulic pumps are driven by separate prime movers, and operation of the actuators is controlled by controlling the direction in which the two hydraulic pumps deliver the pressure fluid and the flow rate of the delivered pressure fluid by the pumps with a common operation signal.

In the hydraulic drive system comprising two hydraulic pumps and two prime movers, the pressure fluid delivered by the two hydraulic pumps can be used in good condition for operating the actuator so long as the two prime movers normally operate. However, when one of the prime movers is shut down for some reason, there is the risk that the pressure fluid delivered by the hydraulic pump connected to the normally operating prime mover is supplied to the other hydraulic pump and might cause same to rotate in the reverse direction, or the hydraulic pump might perform the function of a motor to thereby cause the prime mover connected to the hydraulic pump and other pumps connected to the prime mover, such as, lubricant pump, pilot pump and hydraulic pump for other hydraulic circuit, etc. to rotate in the reverse direction, thereby causing damage thereto.

SUMMARY OF THE INVENTION

An object of this invention is to provide a novel hydraulic drive system comprising a plurality of variable displacement hydraulic pumps connected in parallel with each other and connected to at least one hydraulic actuator, and a plurality of prime movers each driving the plurality of hydraulic pumps, wherein the prime mover not in normal operating condition can be prevented from being forceably rotated by the variable displacement hydraulic pump connected thereto which might function as a hydraulic motor.

Another object of the present invention is to provide a hydraulic drive system of the type described which is provided with means for fluidly cutting off the hydraulic pump connected to the prime mover not in normal operating condition off from the other hydraulic pump and the hydraulic actuator or actuators.

Still another object of the invention is to provide a hydraulic drive system of the type described which is capable, when the hydraulic actuator is stopped or when the flow rate of the pressure fluid delivered by the hydraulic pumps is zero (0), of fluidly cutting off the hydraulic actuator from the hydraulic pumps, to thereby positively keep the hydraulic actuator in a stopped condition.

Other and additional objects, features and advantages of the invention will become more apparent from the description set forth hereinafter when considered in conjuction with the accompanying drawings.

BRIEF DESCRIPTION OF THE DRAWINGS

FIG. 7 is a flow chart of the arithmetic unit used in the system shown in FIG. 6.

DETAILED DESCRIPTION OF THE PREFERRED EMBODIMENTS

Figure 1:
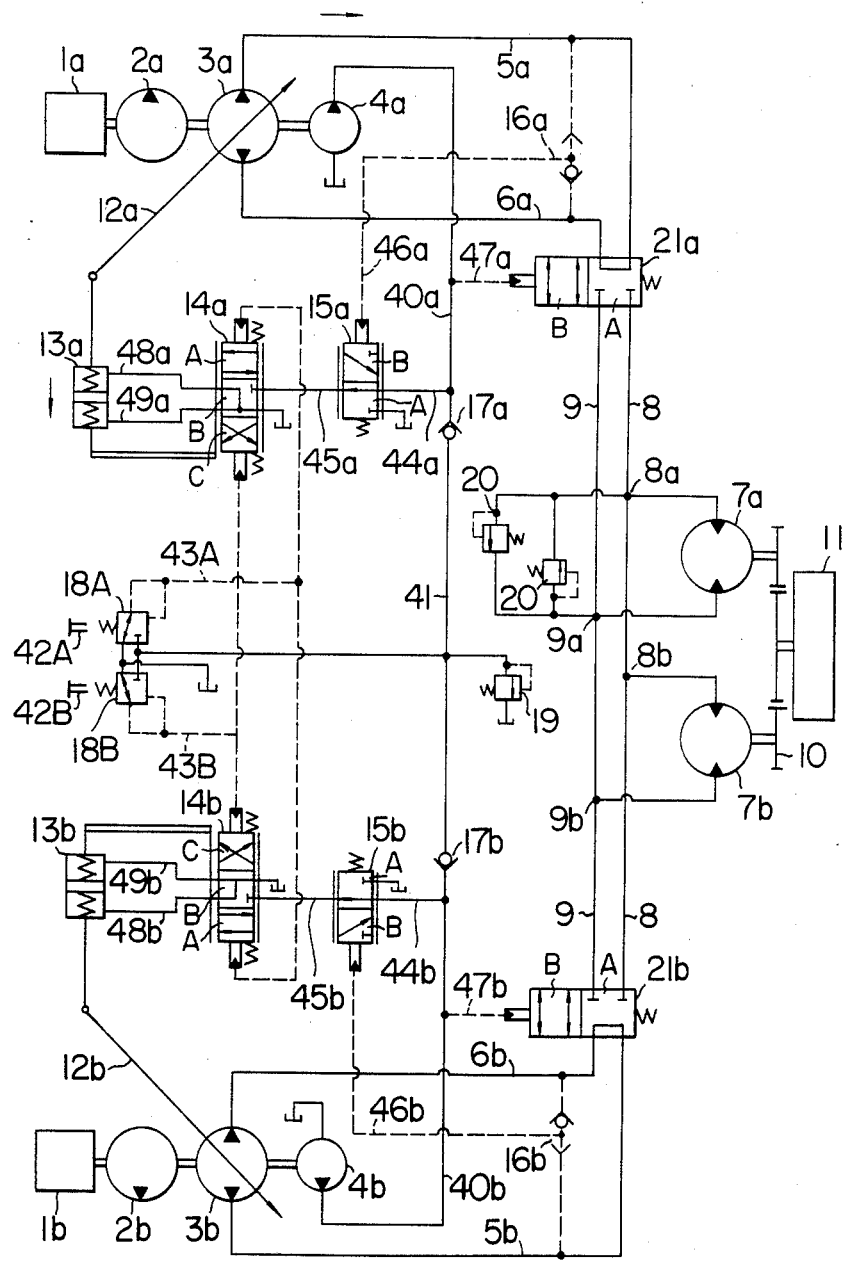
FIG. 1 is a hydraulic circuit diagram showing one embodiment of the hydraulic drive system in conformity with the invention.

Referring now to the drawings wherein like numerals are used throughout the various view to designate like parts and more particularly, to FIG. 1, according to this figure a hydraulic drive system of the invention for driving a single load 11 includes two hydraulic actuators or motors 7a and 7b, drivingly connected to the load 11 through a gearing 10, two variable displacement hydraulic pumps 3a and 3b, and prime movers 1a and 1b for driving the hydraulic pumps 3a and 3b. In addition to the hydraulic pumps 3a and 3b, hydraulic pumps 2a and 2b for another hydraulic drive system and pilot pumps 4a and 4b for producing control pressures are also driven by the two prime movers 1a and 1b. The one variable displacement hydraulic pump 3a is connected through main lines 5a and 6a, a directional control valve 21a and main lines 9 to the two hydraulic motors 7a and 7b to respectively form closed circuits therewith, and the other variable displacement hydraulic pump 3b is also connected through main lines 5b and 6b, a directional control valve 21b and the main lines 8 and 9 to the two hydraulic pumps 7a and 7b to form respectively closed circuits therewith. Stated differently, the one hydraulic motor 7a has connected thereto the two hydraulic pumps 3a and 3b which are connected in parallel with each other at parallel connection points 8a and 9a, and the other hydraulic motor 7b has connected thereto the two hydraulic pumps 3a and 3b which are connected in parallel with each other at parallel connection points 8b and 9b. Overload relief valves 20 are mounted between the main lines 8 and 9 for setting the highest pressure for the main lines. The directional control valves 21a and 21b are for selectively shutting off the associated hydraulic pumps 3a and 3b from the hydraulic motors and other hydraulic pumps and their details will be described later.

The variable displacement hydraulic pumps may be in the form of plunger pumps provided with means 12a and 12b, respectively, for varying the displacement volume, such as a swash plate or eccentric shaft. The displacement volume varying means 12a and 12b have connected thereto known regulators comprising control cylinders 13a and 13b, servo valves 14a and 14b, and cut-off valves 15a and 15b, respectively. The one control cylinder 13a is connected through the servo valve 14a and cut-off valve 15a to a control pressure line 40a connected to the pilot pump 4a, to receive a supply of pressure fluid from the pump 4a. The other control cylinder 13b is connected through the servo valve 14b and cut-off valve 15b to a control pressure line 40b connected to the pilot pump 4b, to receive a supply of pressure fluid from the pump 4b. The lines 40a and 40b are connected to a common control pressure line 41 through check valves 17a and 17b, respectively. The line 41 has connected thereto a relief valve 19 to keep the pressures in the lines 40a, 40b and 41 from exceeding a predetermined adjusted value.

The servo valves 14a and 14b are pilot-operated, three-position valves and movable between opposite extreme positions A and C and a normal neutral position B. The servo valves 14a and 14b have movable sleeves connected to pistons of the control cylinders 13a and 13b respectively. A pair of manually operated pilot valves 18A ahd 18B supply pilot pressures to the servo valves 14a and 14b, respectively. The pilot valves 18A and 18B are variable reduction valves inputting an adjusted pressure from the line 41 and supply to output lines 43A and 43B a pressure proportional to the manipulated variable of manually-operated levers 42A and 42B. The one output line 43A is connected to the two servo valves 14a and 14b in a manner so as to apply pressure thereto to shift the same to position A, and the other output line 43B is connected thereto to apply pressure thereto to shift the same to position C. Thus, the two servo valves 14a and 14b are simultaneously actuated by one manually-operated valve 18A or 18B.

The cut-off valve 15a is a pilot-operated, two-position valve and is movable between a normal position A, in which it allows lines 44a and 45a to communicate with each other, and a position B, in which it releases pressure fluid from the line 45a. The cut-off valve 15a receives as a pilot pressure, a higher main line pressure through a shuttle valve 16a arranged between the main lines 5a and 6a and a line 46a. The other cut-off valve 15b is also a pilot-operated, two-position valve and is movable between a normal position A, in which it allows lines 44b and 45b to communicate with each other, and a position B in which it releases pressure fluid from the line 45b. The cut-off valve 15b receives, as a pilot pressure, a higher main line pressure through a shuttle valve 16b arranged between the main lines 5b and 6b and a line 46b.

The directional control valves 21a and 21b located in the main lines will now be described in detail. The directional control valve 21a is a pilot-operated, two-position valve having two input ports connected to the main lines 5a and 6a on the hydraulic pump 3a side and two output ports connected to the main lines 8 and 9 on the hydraulic motor side. The valve 21a is movable between a normal position A, to which it is biased by a spring, and a position B, to which it is switched by a pilot pressure. When the valve 21a is in position A, the two input ports are brought into communication with each other and the two output ports are individually blocked. When it is in position B, the two input ports are respectively in communication with the output ports. The valve 21a receives a pilot pressure through a line 47a from the line 40a which receives a supply of pressure fluid from the pilot pump 4a. The directional control valve 21b, which is of the same construction as the directional control valve 21a, receives a pilot pressure through a line 47b from the line 40b which receives a supply of pressure fluid from the pilot pump 4b. The directional control valves 21a and 21b each move to position B under the influence of a predetermined adjusted pressure, which is produced by the pilot pumps 4a and 4b in the lines 40a, 40b and 41, when the prime movers 1a and 1b normally operate. However, when the pressure in the lines 40a and 40b drops to a predetermined value as the result of a reduction of the rotational speed of the prime movers 1a and 1b to a predetermined level below the normal rotational speed, the valves 21a and 21b are moved to the normal position A by the biasing force of the spring.

Operation of the hydraulic drive system of the aforesaid construction will now be described. Assume that the prime movers 1a and 1b are both operating normally. This causes a predetermined adjusted pressure to be generated by the relief valve 19 in the lines 40a, 40b and 41. With the adjusted pressure acting on the directional control valves 21a and 21b through the lines 47a and 47b, the valves 21a and 21b are both in position B to bring the main lines 5a, 6a, 5b and 6b into communication with the main lines 8 and 9. Meanwhile when the pilot valves 18A and 18B are inoperative, no pressure is generated in the output lines 43A and 43B thereof, so that the servo valves 14a and 14b are both in normal position B and pistons of the control cylinders 13a and 13b and the displacement volume varying means, 12a and 12b connected thereto, in a neutral position. Thus, the flow rates of pressure fluid delivered by the pumps 3a and 3b are both zero (0), so that the hydraulic motors 7a and 7b remain inoperative.

Assume that the operation lever 42A of one pilot valve 18A is manipulated when the parts of the system are in the aforesaid condition. A displacement of the operation lever 42A causes a pressure commensurate with the displacement to be generated in the output line 43A. The pressure in the output line 43A acts on the servo valves 14a and 14b and causes their spools to shift downwardly and upwardly, respectively, for an amount corresponding to the pressure in the line 43A. The downward shift of the valve spool of the servo valve 14a enables the pressure in the line 40a to be supplied to an upper space of the control cylinder 13a through a line 48a, to thereby downwardly shift the piston in the cylinder 13a. The downward shift of the piston actuates the displacement volume varying means 12a, to cause the hydraulic pump 3a to begin to deliver pressure fluid to the main line 5a. The shift of the piston being fed back to the sleeve of the servo valve 14a, the piston comes to a halt after moving a distance corresponding to the distance covered by the movement of the valve spool of the servo valve 14a. Thus, the flow rate of the pressure fluid delivered by the hydraulic pump 3a has a value which is commensurate with the distance covered by the movement of the valve spool or the amount of displacement of the operation lever 42A of the pilot valve 18A. Likewise, the upward shift of the servo valve 14b actuates the displacement volume varying means 12b of the hydraulic pump 3b, to cause the hydraulic pump 3b to begin to deliver to the main line 5b a supply of pressure fluid at a flow rate commensurate with the amount of displacement of the operation lever 42A. The pressure fluid from the hydraulic pumps 3a and 3b flows through the main lines 5a and 5b into the common main line 8 and actuates the hydraulic motors 7a and 7b to drive the load 11. After actuating the hydraulic motors 7a and 7b, the pressure fluid flows into the main line 9 from which it is returned to the hydraulic pumps 3a and 3b through the main lines 6a and 6b, respectively. In the process in which the flow rate of the pressure fluid delivered by the hydraulic pumps 3a and 3b increases following the operation of the pilot valve 18A, the number of revolutions of the hydraulic motors 7a and 7b might not be able to increase quickly when the load 11 has high inertia. In such a case, the pressure in the main lines 5a and 5b on the discharge side rises. When this pressure reaches a predetermined pressure level for switching the cut-off valves 15a and 15b, the valves 15a and 15b move from normal position A to position B to reduce the flow rate and the pressure of the pressure fluid supplied to the control cylinders 13a and 13b through the servo valves 14a and 14b. Thus, the displacement volume of the variable displacement hydraulic pumps 3a and 3b is adjusted in reverse, to thereby reduce the pressure in the main lines on the higher pressure side. As the aforesaid operation is repeated, the flow rate of the pressure fluid delivered by the hydraulic pumps 3a and 3b slowly changes to the amount corresponding to that of manipulation of the pilot valve 18A while the pressure in the main lines on the higher pressure side is being restricted to a level below the level set for switching the cut-off valves 15a and 15b.

When the other pilot valve 18B is actuated, the hydraulic pumps 3a and 3b deliver pressure fluid to the main lines 6a and 6b, respectively, to thereby rotate the hydraulic motors 7a and 7b in a direction opposite the direction in which they are rotated when the one pilot valve 18A is actuated.

As mentioned above, the hydraulic pumps 3a and 3b are simultaneously controlled by the pilot valves 18A and 18B, to thereby actuate the hydraulic motors 7a and 7b, in case where both prime movers 1a and 1b are normally operating. During operation of the system, it is possible for one of the prime movers to be shut down for some reason. For example, in the event that the one prime mover 1a has its output inordinately lowered when the pilot valve 18A is actuated to increase the flow rate of the pressure fluid delivered by the hydraulic pumps 3a and 3b, the prime mover 1a may be shut down due to an increase in the load applied thereto by the increase in the pressure fluid delivered by the pump 3a. When this is the case, the pilot pump 4a connected to the prime mover 1a will stop rotating, and its delivery pressure or the pressure of the line 40a will drop. A drop in the pressure in the lines 40a allows the directional control valve 21a to move to the normal position A, thereby shutting off the hydraulic pump 3a from the hydraulic motors 7a and 7b and the other hydraulic pump 3b. Thus, the hydraulic motors 7a and 7b are operated only by the pressure fluid from the hydraulic pump 3b. Since the pressure fluid from the hydraulic pump 3b is prevented from flowing to the hydraulic pump 3a by the directional control valve 21a, the variable displacement hydraulic pump 3a is prevented from functioning as a hydraulic motor by using the pressure fluid from the pump 3b, so that the prime mover 1a is prevented from being rotated by the pump 3a functioning as a hydraulic motor. When the directional control valve 21a shifts from the position B to the normal position A, a small volume of pressure fluid may be delivered by the hydraulic pressure pump 3a. This raises no problem because the pressure fluid delivered in this way is returned to the suction port of the pump 3a through the control valve 21a in the normal position A.

After the prime mover 1a is shut down, the control pressure applied to the control cylinder 13a or the pressure in the line 40a becomes zero (0), so that the piston of the control cylinder 13a returns to a neutral position and comes to a halt irrespective of the position of the servo valve 14a. Meanwhile, the other prime mover 1b continues its normal operation and the normal adjusted pressure is applied by the pilot pump 4b to the lines 40b and 41, so that the hydraulic pump 3b is normally controlled by the pilot valves 18A and 18B, and the hydraulic motors 7a and 7b are driven by the pressure fluid supplied by the hydraulic pump 3b.

From the foregoing description, it will be appreciated that in the embodiment shown and described hereinabove, when the number of revolutions of one of the prime movers 1a and 1b drops below a predetermined rpm lower than its normal rpm range, or at the time it is shut down or it rotates in the reverse direction, one of the directional control valves 21a and 21b shifts to the normal position A to shut off the hydraulic pump 3a or 3b connected to the disabled prime mover from the other hydraulic pump and hydraulic motors. Thus, the hydraulic pump connected to the disabled prime mover is prevented from receiving pressure fluid from the other hydraulic pump to function as a hydraulic motor and impart rotation to the prime mover connected thereto.

Figure 2:
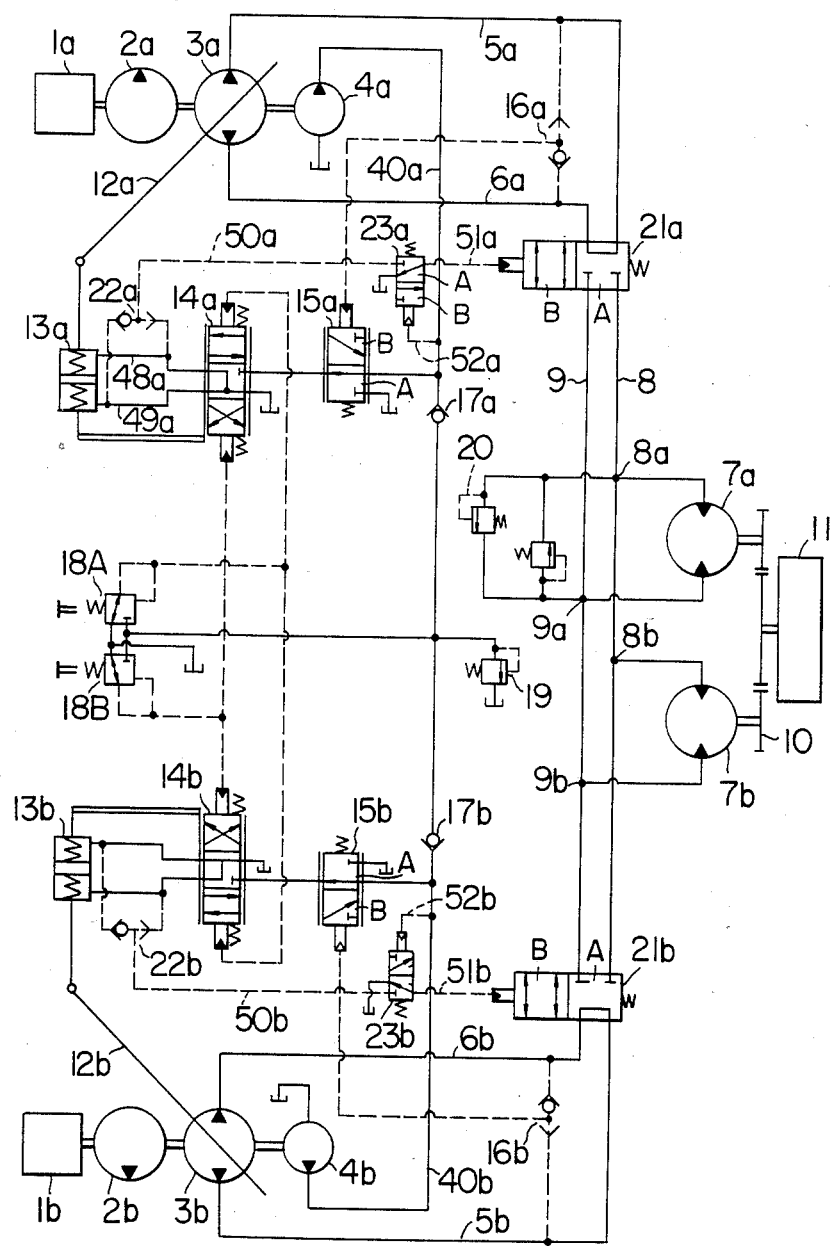
FIG. 2 is a hydraulic circuit diagram showing another embodiment of the hydraulic drive system in conformity with the invention.
Figure 3:
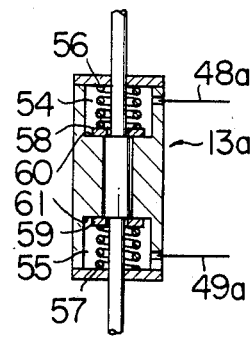
FIG. 3 is a sectional view, on an enlarged scale, of the control cylinder used in the system shown in FIG. 2.

As shown in FIG. 2, the pilot-operated directional control valves 21a and 21b, mounted between the main lines 5a and 6a and main lines 8 and 9, and between the main lines 5b and 6b and the main lines 8 and 9 respectively. The valves 21a and 21b are of the same construction as those shown and described by referring to the embodiment shown in FIG. 1, but the channel through which a pilot pressure is supplied is distinct from the channel through which a pilot pressure is supplied by the counterparts shown in FIG. 1. More specifically, the valve 21a receives a pilot pressure through a shuttle valve 22a mounted between two lines 48a and 49a connected to the control cylinder 13a for taking out a higher pressure, a line 50a, a pilot-operated change-over valve 23a and a line 51a. The change-over valve 23a is movable between a normal position A, in which it releases pressure fluid from the line 51a, and a position B, in which it allows the lines 50a and 51a to communicate with each other, and the pilot pressure is supplied from the line 40a through a line 52a. Likewise, the directional control valve 21b receives a pilot pressure through a shuttle valve 22b, a line 50b, a change-over valve 23b and a line 51b, the change-over valve 23b receiving a pressure from the line 40b through a line 52b. The change-over valves 23a and 23b return to the normal position A when the number of revolutions of the prime movers 1a and 1b drops to a predetermined level lower than the normal rpm thereof and the pressure in the lines 40a and 40b shows a corresponding drop. As shown in FIG. 3, the control cylinder 13a has neutral position restoring springs 56 and 57 and movable spring seats 58 and 59 located in pressure chambers 54 and 55, respectively. The spring seats 58 and 59 are forced against shoulders 60 and 61, respectively, of the cylinder body when the piston is in a neutral position. A predetermined preload is applied to the springs 56 and 57 when the piston is in the neutral position as shown. When the pressure differential between the two pressure chambers 54 and 55 exceeds the preload applied to the springs 56 or 57, the piston is allowed to move. The preload applied to the springs 56 and 57 is set at a level such that a pressure high enough to shift the control valve 21a to the position B is generated in the pressure chamber 54 or 55 before the piston begins to move from the neutral position. The control cylinder 21b is of the same construction as the control cylinder 21a. Other parts of the embodiment shown in FIG. 2 are similar to those of the embodiment shown in FIG. 1, so that their description will be omitted.

While both prime movers 1a and 1b are normally operating, a predetermined adjusted pressure is generated in the control pressure lines 40a, 40b and 41 by the pilot pumps 4a and 4b, and the change-over valves 23a and 23b are shifted to the position B by the pressure in the lines 40a and 40b to allow the lines 50a and 50b to communicate with the lines 51a and 51b, respectively. When the pilot valves 18A and 18B are neutral in position without being manipulated, the servo valves 14a and 14b and the pistons of the control cylinders 13a and 13b are also neutral in position, so that the delivery by the hydraulic pumps 3a and 3b is zero (0). At this time, the lines 48a and 49a and lines 48b and 49b connected to the pressure chambers of the cylinders 13a and 13b, respectively, have the pressure discharged therefrom, so that no pilot pressure is supplied to the control valves 21a and 21b and the valves 21a and 21b are in normal position A. Because of this, the main lines 8 and 9 connected to the hydraulic motors 7a and 7b are closed at their ends. Thus, the hydraulic motors 7a and 7b are prevented from being rotated by an external force exerted on the load 11 when they are shut down, to ensure that the hydraulic motors 7a and 7b and the load 11 are kept stopped without being operated by an external force.

To actuate the hydraulic motors 7a and 7b in the aforesaid condition, the pilot valve 18A or 18B are actuated. Actuation of the pilot valves 18A and 18B controls the displacement volume varying means 12a and 12b of the hydraulic pumps 3a and 3b, respectively, in the same process as described by referring to the embodiment shown in FIG. 1, so that the delivery by the hydraulic pumps 3a, 3b is varied by following up the amount of operation of the pilot valves 18A and 18B. At this time, when the pistons of the control valves 13a and 13b begin to move from the neutral positions, pressure differential greater than the preload applied to the spring 56 or 57 in the pressure chambers 54 and 55, respectively, is generated between the pressure chambers 54 and 55, so that a pressure on the higher pressure side is supplied to the control valves 21a and 21b through the shuttle valves 22a and 22b and change-over valves 23a and 23b. Thus, the valves 21a and 21b are shifted to the position B. Accordingly, when the hydraulic pumps 3a and 3b begin to deliver pressure fluid, the control valves 21a and 21b are already in position B to communicate the main lines 5a, 6a and 5b, 6b with the main lines 8 and 9. In this way, the pressure fluid delivered by the pumps 3a and 3b is supplied to the hydraulic pumps 7a and 7b to drive the same.

In the event that the prime mover 1a has its rpm reduced for some reason when the parts of the system are in the aforesaid condition, the rpm of the hydraulic pilot pump 4a, connected to the prime mover 1a, also decreases and the pressure in the line 40a drops. A drop in the pressure in the line 40a enables the change-over valve 23a to return to the normal position A, thereby releasing pressure fluid from the line 51a. Release of pressure fluid from the line 51a enables the control valve 21a to return to the normal position A as shown, so that the hydraulic pump 3a is shut off by the control valve 21a off the other hydraulic pump 3b and the hydraulic motors 7a and 7b. Thus, the other hydraulic pump is prevented from supplying pressure fluid to the hydraulic pump 3a connected to the prime mover 1a having its rpm reduced to an inordinately low level or shut down, so that the hydraulic pump 3a is kept from acting as a motor.

As mentioned above, in case the prime movers 1a and 1b are normally operating, the hydraulic pumps 3a and 3b, deliver pressure fluid at a flow rate commensurate with the amount of operation of the pilot valve 18A or 18B, to thereby drive the hydraulic motors 7a and 7b, respectively. Upon the pilot valve being returned to a neutral position to shut down the hydraulic pumps 3a and 3b and the load 11, the pistons of the hydraulic cylinders 13a and 13b are moved by the servo valves 14a and 14b toward a neutral position to also move the displacement volume varying means 12a and 12b of the hydraulic pumps 3a and 3b, respectively, to a neutral position, thereby reducing the flow rate of pressure fluid delivered by the pumps. When the load 11 has high inertia, the pressure on the suction side of the pumps rises as the flow rate of pressure fluid delivered by the pumps decreases, and the high pressure on the suction side acts on the cut-off valves 15a and 15b through the shuttle valves 16a and 16b, to thereby switch the cut-off valves 15a and 15b to position B. This keeps the pistons of the control cylinders 13a and 13b from moving, and the flow rate of pressure fluid delivered by the hydraulic pumps 3a and 3b gradually drops while the pressure in the main lines is being controlled to a level below the level at which the cut-off valves 15a and 15b are set to be switched, until reaching zero (0). When the flow rate of pressure fluid delivered by the hydraulic pumps reaches zero (0) or when the pistons of the control cylinders 13a and 13b reach a neutral position, the pressure in the lines 48a, 49a, 48b and 49b communicated with the pressure chambers of the control cylinders 13a and 13b is at a low level, so that the pilot pressure applied to the control valves 21a and 21b is at a low level, to allow the valves 21a and 21b to return to normal position A. Thus, even if the prime movers 1a and 1b are normally operating, the hydraulic motors are shut off from the hydraulic pumps when the flow rate of pressure fluid delivered by the hydraulic pumps becomes zero (0) or the hydraulic motors 7a and 7b stop rotating. This permits the hydraulic motors to be kept stopped irrespective of an external force exerted thereon.

It is also possible in the embodiment shown in FIG. 2, when one of the prime movers is not in normal operation, such as when it is shut down, to return the control valve 21a or 21b to the normal position A and to shut the hydraulic pump connected to the disabled prime mover off from the other hydraulic pump and hydraulic motors. Additionally, in the embodiment shown in FIG. 2, it is possible, when the flow rate of pressure fluid delivered by the hydraulic pumps is zero (0), to close the ends of the main lines connected to the hydraulic motors, so as to thereby positively keep the hydraulic motors stopped.

Figure 4:
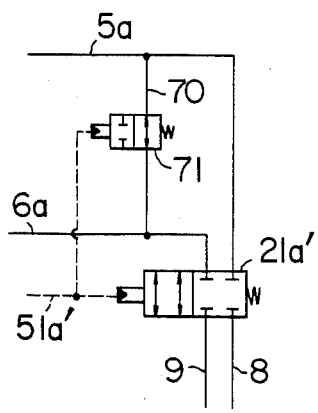
FIGS. 4 and 5 are hydraulic circuit diagrams showing modifications of directional control valve used in the system shown in FIG. 2.
Figure 5:
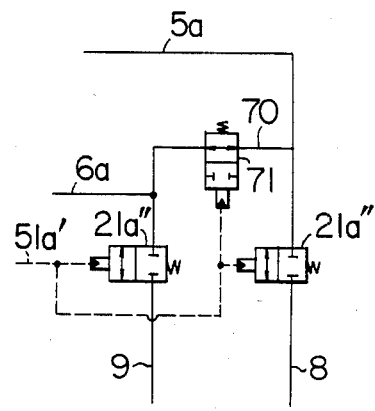

In the embodiments shown in FIGS. 1 and 2, one of the four-port, two-position directional control valves 21a and 21b is used as means for shutting one of the hydraulic pumps off from the other hydraulic pump and hydraulic motors. It is to be understood that the invention is not limited to this specific form of the embodiments and that modifications may be made thereto within the scope of the invention. In FIG. 4, a four-port, two-position valve 21a' provided with no internal bypass passage is used, and a bypass passage 70 mounting a shut-off valve 71 connects the main lines 5a and 6a together. The valves 21a' and 71 are simultaneously switched by the pressure in a line 51a' corresponding to the line 51a shown in FIG. 2. In FIG. 5, two shut-off valves 21a'' are used in place of the single control valve 21a'; however, the modifications shown in FIGS. 4 and 5 perform the same operation as the embodiment shown in FIG. 2.

Figure 6:
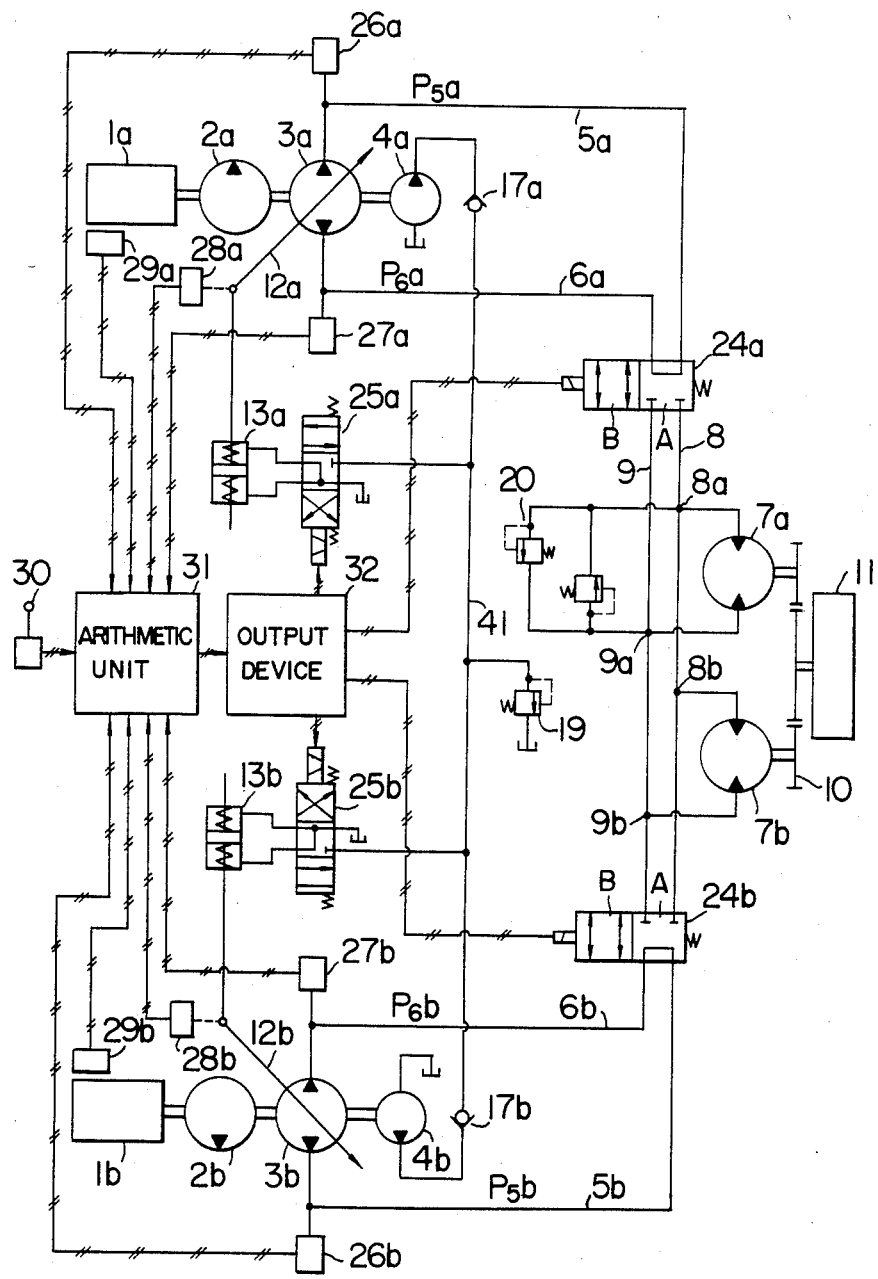
FIG. 6 is a hydraulic circuit diagram showing still another embodiment distinct from the embodiments shown in FIGS. 1 and 2.

In FIG. 6 shows still solenoid-operated valves 24a and 24b are used in place of the pilot-operated valves 21a and 21b shown in FIGS. 1 and 2, and the supply of pressure fluid to the control cylinders 13a and 13b, for controlling the displacement volume varying means 12a and 12b of the hydraulic pumps 3a and 3b, respectively, is controlled by operating valves 25a and 25b which, in turn, are electrically controlled.

Pressures P5a, P6a, P5b and P6b in the main lines 5a, 6a, 5b and 6b are sensed by pressure sensors 26a, 27a, 26b and 27b, respectively. Displacements X and X' of the displacement volume varying means 12a and 12b from the neutral position are sensed by displacement sensors 28a and 28b, respectively. The rotational speeds N and N' of the prime movers 1a and 1b are sensed by RPM sensors 29a and 29b, respectively. The signals produced by the sensors 29a, 29b and a signal representing a manipulated variable $X_L$ of an operating lever 30 from the neutral position are inputted to an arithmetic unit 31 which does the necessary calculations and supplies control signals to an output device 32. Upon receipt of the control signals, the output device 32 supplies commands to the directional control valves 24a and 24b and the operating valves 25a and 25b, to effect control of these valves.

The arithmetic unit 31 can operate by using an ordinary arithmetic circuit. However, the arithmetic unit 31 will be described as being used with a microcomputer and its operation will be described by referring to a flow chart shown in FIG. 7. The description only refers to the prime mover 1a, and it is to be understood that the prime mover 1b operates in the same manner as the prime mover 1a. It is also to be understood that when the value of X is positive, pump 3a delivers pressure fluid to the main line 5a and when it is negative, pump 3a delivers pressure fluid to the main line 5b.

In step S1, data $X_L$, P5a, P6a, X and N are read in. In step S2, it is determined whether or not the rotational speed N of the prime mover is greater than a predetermined set value close to zero (0) or whether or not the prime mover is rotating normally. If the rotation is not normal, then the process proceeds to step S3 in which a displacement command Y to be supplied to the displacement volume varying means 12a is determined to Y=0. In step S4, a command is given to the output device 32 to supply a command signal Y−X (=−X) to the operating valve 25a to render the displacement X of the varying means 12a zero (0) or to render the displacement volume zero (0) and to supply a command signal "close" to the directional control valve 24a to shift same to position A.

When the prime mover 1a is normally rotating, the process proceeds from step S2 to step S5 in which it is determined whether or not the manipulated variable $X_L$ of the lever 30 is essentially zero (0). When $X_L$ is zero (0), the process proceeds to step S6; when not zero (0), the process proceeds to step S7. In step S6, it is determined whether or not the displacement X is essentially zero (0). When X is essentially zero (0), the process proceeds to step S3 and then to step S4. When X is not essentially zero (0), the process proceeds to step S7.

In step S7, it is determined whether or not the value of $|X_L−X|$ is below an insensitive zone level ε. When it is equal to or below ε, the process proceeds to step S8 in which it is determined whether or not the main line pressures P5a and P6a are higher than preset values. When they are below the preset values, the process proceeds to step S9 in which a displacement command Y is determined to Y=X to hold the present value of displacement X as it is. Then, the process proceeds to step S10. In step S10, a command is given to the output device 32 to supply a command signal Y−X (=0) to the operating valve 25a and to supply a command signal "open" to the directional control valve 24a to shift same to position B.

Figure 8:
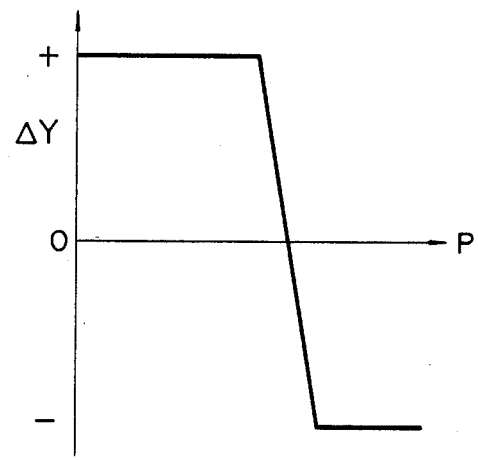
FIG. 8 is a graph used for reading out $\Delta Y$ in steps S12 and S14 of the flow chart shown in FIG. 7.

When $|X_L−X|$ is higher than the insensitive zone level ε or when the main line pressures P5a and P6a are higher than the set values, the process proceeds to step S11, in which it is determined whether or not $X_L−X$ is larger than zero (0). When $X_L−X>0$, an increment ΔY corresponding to the main line pressure P5a is read out of the functional relationship shown in FIG. 8 which is set previously. In FIG. 8, functions are preset in such a manner that, even if the flow rate of the pressure fluid delivered by the pump 3a is varied by displacing by ΔY the displacement volume varying means 12a, a predetermined allowable highest pressure is not exceeded by the main line pressure P5a or P6a. In step S13, the displacement command Y is determined to Y=X+ΔY, and then, in step S10, a command is given to the output device 32 to supply a command signal to the operating valve 25a to increase the displacement X by ΔY and to supply a command signal "open" to the directional control valve 24a.

When $X_L−X≦0$, in step S14, a decrement −ΔY of the displacement command Y which would not cause the main line pressure P6a to exceed the predetermined allowable highest pressure is read out of the functional relation shown in FIG. 8. In step S15, the displacement command Y is determined to Y=X−ΔY, and, in step S10, a command is given to the output device 32 to supply a command signal Y−X (=−ΔY) to the operating valve 25a, to decrease the displacement X by ΔY and to supply a command signal "open" to the direction control valve 24a.

The process described hereinabove is repeated. When the prime movers 1a and 1b are normally rotating and the manipulated variable $X_L$ of the operating lever 30 is not zero (0) or the operating lever 30 is not in a neutral position, the varying means 12a and 12b are shifted until their displacement agrees with the manipulated variable $X_L$. While the varying means 12a and 12b are being shifted, the internal pressures of the main lines 5a, 6a, 5b and 6b are kept below the predetermined allowable values. In the event that the prime mover 1a or 1b shifts from the normal operation condition to an abnormal operating condition, the directional control valves 24a and 24b are switched to the position A. Thus, the hydraulic pump 3a or 3b connected to the prime mover 1a or 1b not in normal operating condition is shut off from the other hydraulic pump and prevented from being forceably rotated by the pressure fluid delivered by the other hydraulic pump. At the same time, a signal to return the varying means 12a or 12b to a neutral position is supplied to the operating valve 25a or 25b associated with the prime mover not in normal operating condition, so that the varying means 12a or 12b is returned to a neutral position and stops. In this connection, attention should be directed to the fact that, in this embodiment, a pressure signal supplied to the operating valves 25a and 25b is given from the line 41 interposed between the check valves 17a and 17b, so that even after one of the pilot pumps 4a or 4b has stopped rotating, a pressure of a predetermined adjusted value is supplied to both valves 25a and 25b. When the operating lever 30 is in the neutral position and the flow rate of the pressure fluid delivered by the hydraulic pumps 3a and 3b is essentially zero (0), the directional control valves 24a and 24b are moved to shutting position A to ensure that the hydraulic motors 7a and 7b are held in shutdown position against an external position, even if the prime movers 1a and 1b are normally rotating.

In the embodiment shown in FIG. 6, revolution meters 29a and 29b are used as means for sensing whether or not the prime movers 1a and 1b are in normal operating condition. However, the invention is not limited to this specific form of rotation condition sensing means and any other suitable known means, such as means for sensing the output pressure of a prime mover lubricant supply pump, means for sensing the output current of a generator driven by the prime movers, etc. The aim of sensing that the flow rate of the pressure fluid delivered by the variable displacement hydraulic pumps 3a and 3b and the command thereto have become essentially zero (0) can be attained by sensing both a control pressure linked to the operating lever and a control pressure associated with the flow rate of the pressure fluid delivered by the pump, such as an output pressure of the neutral position detecting port formed in the servo valve or an output side pressure of the cut-off valve.

While preferred embodiments of the invention have been described using specific terms, such description is for illustrative purposes only, and it is to be understood that changes and variations may be made without departing from the spirit or scope of the following claims.

What is claimed is:

1. A hydraulic drive system including at least one hydraulic actuator, a plurality of variable displacemtnt hydraulic pumps, each of said hydraulic pumps being connected to said hydraulic actuator in a manner so as to form a closed hydraulic circuit therewith and said hydraulic pumps being connected in parallel with each other, and a plurality of prime movers each connected to one of said plurality of hydraulic pumps to drive the same, characterized by:

valve means associated with each one of said hydraulic pumps to fluidly and selectively shut off the hydraulic pump associated therewith from said hydraulic actuator and from the other hydraulic pump, said valve means being respectively disposed between said hydraulic actuator and the associated hydraulic pump; and control means associated with each one of said prime movers to control said valve means in accordance with an operating condition of the prime mover in such a manner that when the prime mover is not in a normal operating condition, the hydraulic pump connected to the prime mover not normally operating is fluidly shut off from said hydraulic actuator and the other hydraulic pump.

2. A hydraulic drive system as claimed in claim 1, wherein each of said valve means comprise a two-position directional control valve formed with two input ports communicating with one of the hydraulic pumps and two outputs communicating with the actuator, said two-position directional control valve being movable between a first position in which the two input ports are brought into communication with each other and the two output ports are shut off from each other and a second position in which the two input ports and the two output ports are connected to each other.

3. A hydraulic drive system as claimed in claim 2, wherein said two-position directional control valve comprises a pilot-operated valve normally disposed in the first position, and wherein said control means each comprise a hydraulic pilot pump driven by the prime mover, and conduit means to cause a pressure fluid delivered by said pilot pump to act on the directional control valve in a manner to shift same to the second position.

4. A hydraulic drive system as claimed in claim 2, wherein said two-position directional control valve comprises a solenoid-operated valve normally disposed in the first position, including a solenoid energized when the prime mover is in normal operating condition.

5. A hydraulic drive system as claimed in claim 4, wherein said control means each comprise means for sensing the number of revolutions of the prime mover, means for determining whether the sensed number of revolutions is greater or smaller than a predetermined set value, and means for energizing the solenoid of the directional control valve when the sensed number of revolutions is greater than the set value.

6. A hydraulic drive system as claimed in claim 1, wherein said control means for said valve means each comprise additional means operative to control said valve means in response to the flow rate of pressure fluid delivered by the hydraulic pump, to thereby fluidly shut off the hydraulic pump from said hydraulic actuator and the other hydraulic pump when the flow rate of pressure fluid delivered by the hydraulic pump is essentially zero.

7. A hydraulic drive system as claimed in claim 6, wherein said valve means each comprise a two-position directional control valve formed with two input ports communicating with one of the hydraulic pumps and two output ports communicating with the actuator, said two-position directional control valve being movable between a first position in which the two input ports are brought into communication with each other and the two output ports are shut off each other and a second position in which the two input ports and the two output ports are connected to each other.

8. A hydraulic drive system including at least one hydraulic actuator, a plurality of variable displacement hydraulic pumps, each of said hydraulic pumps being connected to said hydraulic actuator in a manner to form a closed hydraulic circuit therewith and said hydraulic pumps being connected in parallel with each other, and a plurality of prime movers each connected to one of said plurality of hydraulic pumps to drive the same, characterized by:

valve means each associated with one of said hydraulic pumps to fluidly and selectively shut off the hydraulic pump associated therewith from said hydraulic actuator and the other hydraulic pump, said valve means each comprise a two position directional control valve formed with two input ports communicating with one of the hydraulic pumps and two output ports communicating with the actuator, said two position directional control valve being movable between a first position in which the two input ports are brought into communication with each other end the two output ports are shut off from each other and a second position in which the two input ports and the two output ports are connected to each other, wherein said directional control valve comprises a pilot-operated valve normally disposed in the first position; and control means each associated with one of said prime movers to control said valve means in accordance with an operating condition of the prime mover in such a manner that when the prime mover is not in a normal operating condition, the hydraulic pump connected to the prime mover not normally operating is fluidly shut off from said hydraulic actuator and the other hydraulic pump, said control means for said valve means each comprise additional means operative to control said valve means in response to the flow rate of pressure fluid delivered by the hydraulic pump, to thereby fluidly shut off the hydraulic pump from said hydraulic actuator and the other hydraulic pump when the flow rate of pressure fluid delivered by the hydraulic pump is essentially zero, and wherein said control means each comprise a hydraulic pilot pump driven by said prime mover, a shuttle valve communicating with opposite two pressure chambers of a control cylinder which is provided to drive displacement volume adjusting means for the hydraulic pump, first conduit means supplying an output of said shuttle valve to the pilot operated directional control valve as pilot pressure, the pilot operated two-position change-over valve mounted in said first conduit means and movable between a first position in which the directional control valve has a pilot pressure released therefrom and a second position in which said shuttle valve is brought into communication with the directional control valve, and a second conduit means for supplying pressure fluid delivered by said pilot pump to said change-over valve as a pilot pressure.

9. A hydraulic drive system as claimed in claim 6, further comprising a bypass passage connecting together two main lines connected to two ports of each said hydraulic pump, and an additional shut-off valve for opening and blocking said bypass passage, said additional shut-off valve being operatively connected to said valve means.

10. A hydraulic drive system as claimed in claim 7, wherein said directional control valve is a solenoid-operated valve normally disposed in the first position, and wherein said control means each comprise means for sensing the number of revolutions of the prime mover, first means for sensing whether the sensed number of revolutions is greater or smaller than a predetermined set value, second means for determining whether or not the flow rate of pressure fluid delivered by the hydraulic pump and the command value given thereto are both essentially zero, and means responsive to said first means and said second means to energize said solenoid-operated value when the sensed number of revolutions is greater than the predetermined set value and the flow rate of pressure fluid delivered by the hydraulic pump and the command value given thereto are not essentially zero.

* * * * *